No. 696,594. Patented Apr. 1, 1902.
W. REID.
LUBRICATING PULLEY.
(Application filed Nov. 4, 1901.)
(No Model.)
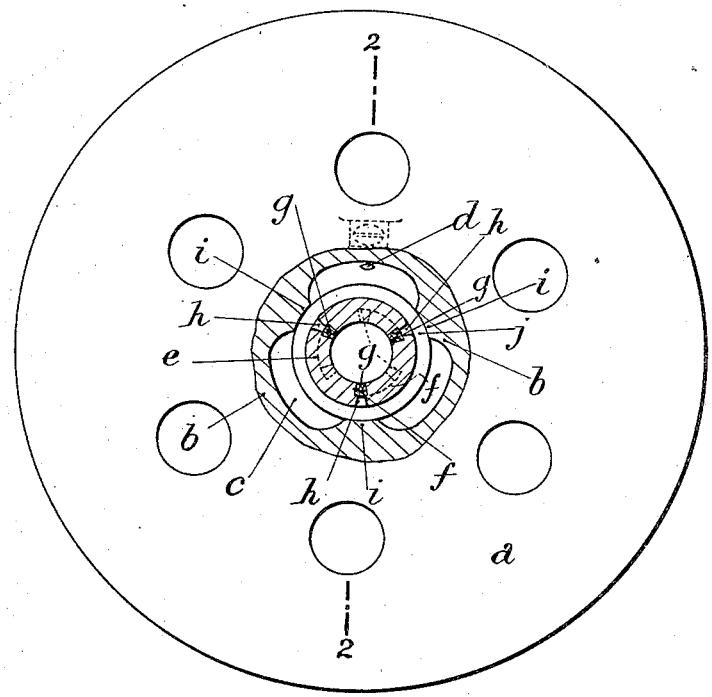
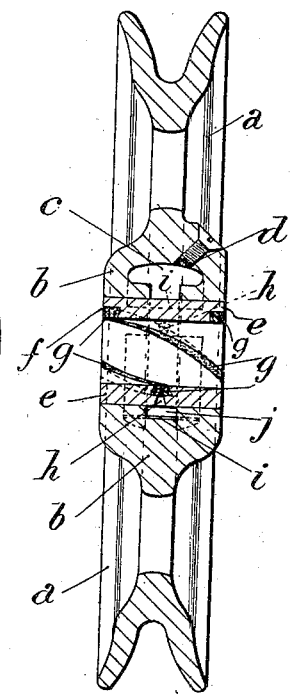
Witnesses
Thomas Kirkpatrick
H Van Heerenbrinck
Inventor
William Reid
by Alexander & Co.
Attorneys

UNITED STATES PATENT OFFICE.

WILLIAM REID, OF LONDON, ENGLAND.

LUBRICATING-PULLEY.

SPECIFICATION forming part of Letters Patent No. 696,594, dated April 1, 1902.

Application filed November 4, 1901. Serial No. 81,081. (No model.)

*To all whom it may concern:*

Be it known that I, WILLIAM REID, a subject of the King of Great Britain and Ireland, and a resident of London, England, have invented a certain new and useful Improvement in Lubricating-Pulleys; and I do hereby declare the following to be a full, clear, and exact description of the same.

This invention relates to the lubrication of pulleys, sheaves, wheels, and the like which rotate about shafts, its object being to provide for the long-continued automatic lubrication of such parts in the improved manner hereinafter described.

To this end the invention is characterized by the combination of a pulley having a lubricant-reservoir formed around within its hub with a bush fitted to the pulley-hub and to the shaft and having grooves in its working periphery packed with leather, asbestos, or other suitable lubricant-absorbent, by which the lubricant is applied to the shaft, and channels serving to conduct the lubricant from said reservoir to said packing, the reservoir being formed with one or a plurality of contracted parts serving to counteract or modify the centrifugal effect on the lubricant of the rotation of the pulley and to cause the lubricant to be brought into close contact with the channels conducting it to said packing, and the packing-holding grooves being arranged helically in relation to the shaft-axis, so as to cause some part or parts of said packing to rest on the shaft in whatever position the pulley may stop and as to cause said packing to serve not only to apply the lubricant to the shaft, but also to give an endwise motion to the lubricant in the direction of the axis of the shaft, tending to keep the latter free from any accumulation thereon.

On the accompanying drawings, Figure 1 represents a side elevation, partly in section, of a pulley-block sheave adapted according to the present invention. Fig. 2 is a sectional elevation on the line 2 2, Fig. 1.

The pulley $a$ is formed around and within its hub $b$ with a lubricant-reservoir $c$, having a closable inlet $d$, which may be situated at any convenient part of the pulley. The pulley-hub is fitted with a bush $e$, adapted also to fit the shaft on which the pulley is mounted and which is formed on its inner periphery with helically-disposed grooves $f$, which are packed with leather, asbestos, or other suitable lubricant-absorbent $g$, and is formed with outer radiating channels $h$, which may be connected by a channel surrounding the bush, serving to supply the lubricant from the reservoir $c$ to the packing $g$, which supplies it direct to the shaft and at all times and in all positions of stoppage of the pulley rests with some part thereof on the shaft.

The lubricant-reservoir $c$ is formed of a series of concavities extending into the body of the pulley or wheel around the bore, and the solid portions $i$, which separate these concavities, are provided with short channels $j$, which together form an annular channel connecting the said concavities. By thus subdividing the reservoir $c$ the centrifugal effect on the lubricant due to the rotation of the pulley is modified and it is caused to pass to the radial channels $h$ in the bush $e$ and thence to the groove $f$ and packing $g$, the said radial channels leading from the short connecting-channels $j$. The solid portions $i$ also strengthen the hub and afford bearing-surfaces for the bush.

What I claim as my invention, and desire to secure by Letters Patent, is—

1. A lubricating pulley or wheel, provided within and around its bore with a series of concavities and a series of short channels in its intermediate solid portions connecting said concavities, and a bushing fitting the solid portion of the bore and forming one wall of the reservoir formed by the said concavities and short channels, the said bush having in its inner wall a helical groove and a channel connecting said groove with one of the said short channels; substantially as described.

2. A lubricating pulley or wheel provided within and around its bore with an annularly-arranged series of concavities, a series of short channels $j$ in its intermediate solid portions $i$, and a filling-opening, and a bushing $e$ fitting the bore and forming one wall of the reservoir $c$ formed by said concavities; the said bushing having a series of helical grooves $f$ in its inner wall and channels $h$ leading from the said grooves to the channels $j$, and an absorbent material in the grooves $f$; substantially as described.

In testimony whereof I have signed this specification in the presence of two subscribing witnesses.

WM. REID.

Witnesses:
 JOS. B. MIDDLETON,
 GEO. M. SHEPPARD.